United States Patent [19]
Okazaki et al.

[11] Patent Number: 5,216,584
[45] Date of Patent: Jun. 1, 1993

[54] FUSED CHIP-TYPE SOLID ELECTROLYTIC CAPACITOR AND METHOD OF MANUFACTURING THE SAME

[75] Inventors: Masashi Okazaki; Yukio Sugisaki, both of Tokyo, Japan

[73] Assignee: NEC Corporation, Tokyo, Japan

[21] Appl. No.: 829,393

[22] Filed: Feb. 3, 1992

[30] Foreign Application Priority Data

Feb. 15, 1991 [JP] Japan .................... 3-21892

[51] Int. Cl.$^5$ .............................. H01G 9/06
[52] U.S. Cl. ........................ 361/534; 29/25.03
[58] Field of Search .......... 29/25.03; 361/534, 539, 361/540

[56] References Cited

U.S. PATENT DOCUMENTS

4,899,258  2/1990  Gouvernelle .............. 361/534
4,935,848  6/1990  Yamane et al. ............ 361/534

FOREIGN PATENT DOCUMENTS

0350366  10/1990  European Pat. Off. .

Primary Examiner—Donald A. Griffin
Attorney, Agent, or Firm—Laff, Whitesel, Conte & Saret

[57] ABSTRACT

A fused chip-type solid electrolytic capacitor is provided in which a cathode terminal comprises a connecting portion and a leading portion formed separately to each other, a fuse is provided between the connecting portion and leading portion thereof in a cross linking manner to connect them electrically, and an electrically insulative protective body provided thereon to connect them mechanically and integrally. The cathode terminal formed as shown above is connected through said connecting portion to a cathode layer of a capacitor element, and led through said leading portion to the outside of an external resin. In this capacitor, the electrically insulative protective body for coupling the connecting portion and leading portion of the cathode terminal may cover a fuse itself and the positions where the fuse is connected correspondingly to the connecting portion and leading portion, but it is preferably to cover a surface of said leading portion on the capacitor element side as well.

20 Claims, 4 Drawing Sheets

FUSED CHIP-TYPE SOLID ELECTROLYTIC CAPACITOR AND METHOD OF MANUFACTURING THE SAME

BACKGROUND OF THE INVENTION

1. Field of the Invention

This invention relates to a solid electrolytic capacitor and a method of manufacturing the same, and more particularly to a fused chip-type solid electrolytic capacitor and a method of manufacturing the same.

2. Description of the Prior Art

Solid electrolytic capacitors have been widely used in various electronic circuits, which is made advantageous in that a failure rate is small in general. In this case, however, if once the failure is occurred, it often results in a mode of a short circuit. If the short circuit happens, then a large short-circuit current flows to heat the capacitor element and sometimes to burn the capacitor element itself. In order that the capacitor element is prevented from being burnt when the fault due to excessive short-circuit current is happened as well as that other circuit components are protected from being damaged accompanied therewith, it is required that the capacitor element is not to be shorted when a failure is happened. For this, a fuse is generally incorporated into a solid electrolytic capacitor conventionally. Such a solid electrolytic capacitor that a fuse is incorporated as above is called fused solid electrolytic capacitor.

FIG. 1 is a perspective view of a conventional fused chip-type solid electrolytic capacitor, and FIG. 2 is a cross-sectional view of the capacitor shown in FIG. 1. In case of a conventional fused chip-type solid electrolytic capacitor, a capacitor element 1 has an anode lead 2 which is disposed insertedly into the top surface thereof and a cathode layer 3 which is disposed thereon so as to cover the bottom and side surfaces thereof. An anode terminal 4 of a bent metal plate is connected by welding to the anode lead 2 and a cathode terminal 5 of a bent metal plate is adhesively fixed onto the cathode layer 3 with an electrically insulative adhesive material 6. The cathode layer 3 and the cathode terminal 5 are electrically connected to each other through a fuse 7 disposed therebetween in a cross linking manner. Each end of the fuse 7 is connected through a solder 8 to the corresponding one of the cathode layer 3 and the cathode terminal 5. In addition, the fuse 7 itself is entirely covered with an elastic resin 9. The capacitor element 1, anode lead 2, cathode layer 3 and fuse 7 all are encapsulated as an assembly with a rectangular parallelepiped-shaped external resin 10. One end of the anode terminal 4 and one end of the cathode terminal 5 are encapsulated as an assembly with the external resin 10, and the other part of the anode terminal 4 and the other part of the cathode terminal 5 are respectively bent into a L-like shape along the outer-most surface of the external resin 10 thereby to be exposed to the outside thereof.

With the conventional fused chip-type solid electrolytic capacitor as shown above, the following problems have been pointed out to be arisen; first, because the fuse 7 is connected directly to the cathode layer 3 of the capacitor element 1, if an excessive electric current flows to heat the fuse 7, the capacitor element 1 itself may be damaged by burning. In addition, a solder 8 applied onto the cathode layer 3 may be melted by this heat to be thermally expanded, resulting in giving a damage to the external resin 10. Further in addition, the solder to be flowed out from a broken surface of the external resin 10 can make other circuits short electrically, which may result in occurrence of a secondary accident, and in an excessive case, the whole of the circuitry may be catastrophically damaged.

Secondary, the electrically insulative adhesive material 6 is applied in order that the cathode layer 3 of the capacitor element 1 and the cathode terminal 5 are connected to each other while keeping insulation, so that in the process of connecting the fuse 7 thereto, the cathode layer 3 and the cathode terminal 5 may be electrically shorted in the process of curing the electrically insulative adhesive material 6. As a result, it is required to make at least one of the cathode layer 3 and the cathode terminal 5 insulative in advance. In addition, size and shape of the capacitor element 1 are different depending on the capacity and the withstand voltage, so that the position where the fuse 7 and the cathode layer 3 are to be soldered becomes unstable in the process of connecting the fuse 7 thereto, which means that the fuse 7 is difficult to be soldered thereto automatically. For the reasons as shown above, a conventional fused chip-type solid electrolytic capacitor unavoidably becomes sophisticated in the manufacturing process, particularly in the process of connecting a fuse, thus arising such a problem that it is difficult to improve the reliability of fuse connection as well as to reduce the production cost.

This invention was made in consideration of these disadvantages, and an object of this invention is to provide a fused chip-type solid electrolytic capacitor capable of preventing a solder from flowing out from a cathode layer and a capacitor element from being damaged by burning even when a short-circuit is taken place, and a method of manufacturing the same.

Another object of this invention is to provide a fused chip-type solid electrolytic capacitor in which a fuse connection process can be easily automatized, so that the production cost can be reduced while keeping the reliability of fuse connection, and a method of manufacturing the same.

SUMMARY OF THE INVENTION

A fused chip-type solid electrolytic capacitor of this invention is featured in that a cathode terminal comprises a connecting portion and a leading portion formed separately to each other, a fuse is provided between the connecting portion and leading portion in a cross linking manner to connect them electrically, and an electrically insulative coupling body is provided thereon to connect them mechanically and integrally. The cathode terminal formed as shown above is connected through the connecting portion to a cathode layer of a capacitor element and led through the leading portion to the outside of an electrically insulating material.

In this capacitor, the electrically insulative coupling body for connecting the connecting portion and leading portion of a cathode terminal may cover a fuse itself and a position where each end of the fuse is connected to the corresponding one of the connecting portion and leading portion, but it is preferable to cover a surface of the leading portion on the capacitor element side as well. This means that the electrical insulation can be surely maintained between the cathode terminal and the capacitor element, and in the fuse connecting process, occurrence of a short-circuit due to contact of the cathode terminal with the capacitor element during thermosetting the external resin can be advantageously prevented.

A method of manufacturing a fused chip-type solid electrolytic capacitor in accordance with this invention features that a cathode terminal is formed in such a manner that a metal plate is machined to form a connecting portion and a leading portion which are disposed separately to each other and a coupling portion for coupling the connecting portion and leading portion, a fuse is provided between the connecting portion and leading portion in a cross linking manner to connect them electrically, and an electrically insulative coupling body is provided thereon to cover said fuse as well as to couple the connecting portion and leading portion mechanically. Accordingly, the cathode terminal including the connecting portion and the leading portion which are electrically connected through the fuse to each other is obtained. This cathode terminal is fixed through the connecting portion to a cathode layer of a capacitor element. The coupling portion is cut thereafter.

DESCRIPTION OF THE PREFERRED EMBODIMENTS

Figure 1:
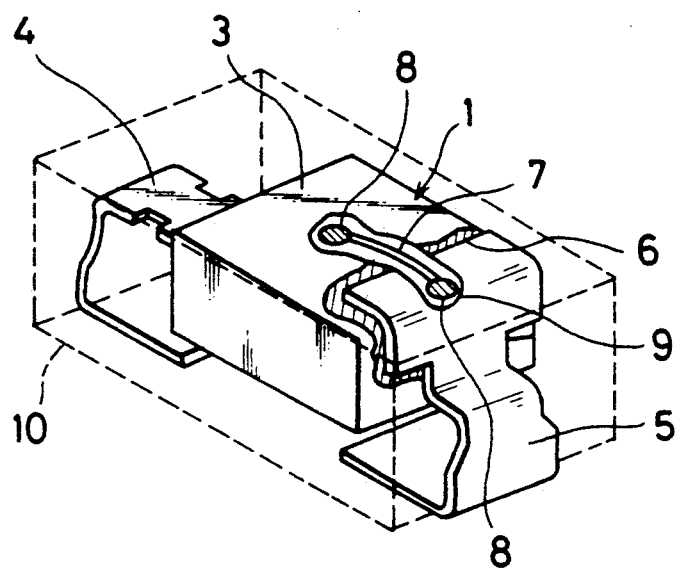
FIG. 1 is a partially sectioned perspective view of a conventional fused chip-type solid electrolytic capacitor.

Preferred embodiments of this invention will be described below while referring to the drawings attached.

FIRST EMBODIMENT

Figure 3:
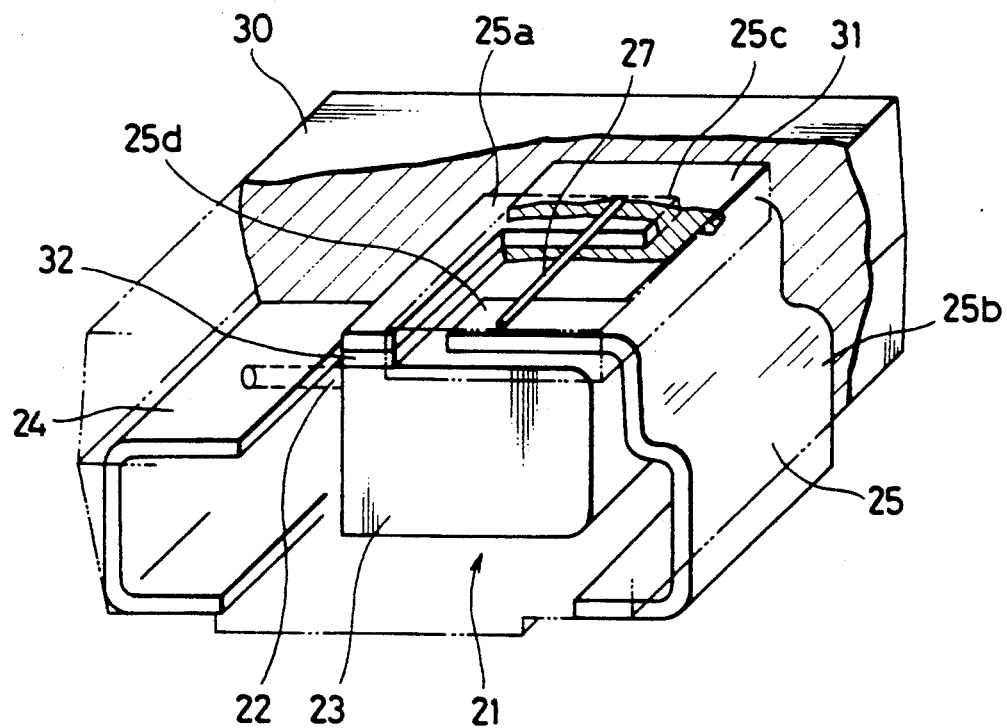
FIG. 3 is a partially sectioned perspective view of a fused chip-type solid electrolytic capacitor according to a first embodiment of this invention.
Figure 4:
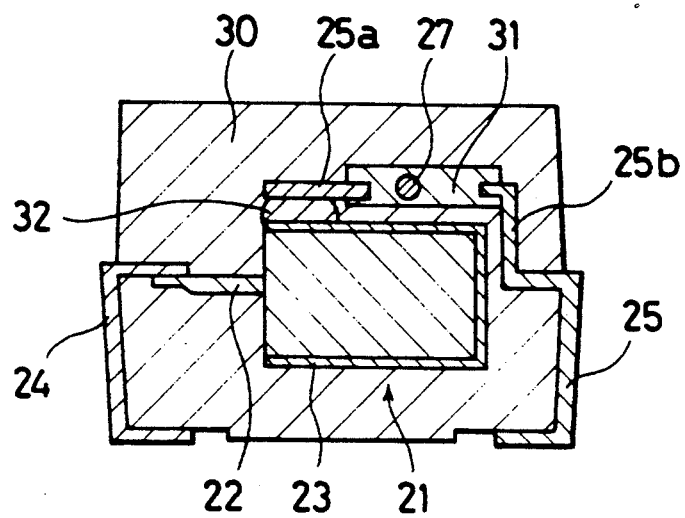
FIG. 4 is a cross-sectional view of the fused chip-type solid electrolytic capacitor shown in FIG. 3.
Figure 5:
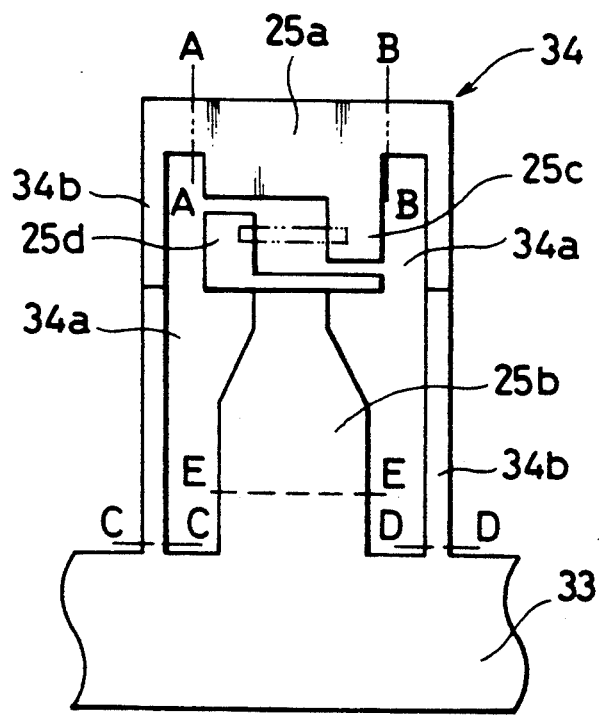
FIG. 5 is a plan view showing a state of a cathode terminal of the fused chip-type solid electrolytic capacitor shown in FIG. 3 before being assembled.

FIGS. 3 to 5 are for explaining a fused chip-type solid electrolytic capacitor according to a first embodiment of this invention. Similar to the above-described conventional solid electrolytic capacitor, the fused chip-type solid electrolytic capacitor according to the first embodiment has an anode lead 22 insertedly provided into the top surface of a capacitor element 21 and a cathode layer 23 provided thereonto so as to surroundingly cover the bottom and side surfaces thereof. An anode terminal 24 of a bent metal plate is connected to the anode lead 22. The fused chip-type solid electrolytic capacitor of this embodiment, however, is different in structure of a cathode terminal 25 from a conventional one.

Namely, the cathode terminal 25 which is formed of a bent metal plate has a connecting portion 25a connected to the cathode layer 23 of the capacitor element 21 and a leading portion 25b connected to the connecting portion 25a and having one part led out externally of an external resin 30. The connecting portion 25a and leading portion 25b thereof are not connected to each other by the same metal plate. An end 25c of the connecting portion 25a and an end 25d of the leading portion 25b are disposed juxtaposingly in an opposite direction extension manner, between which a fuse 27 is provided in a cross linking manner. The fuse 27, and the ends 25c and 25d are covered with a protective resin 31 thereby to make them connect and integrate simultaneously. As the protective resin 31, any resin which is electrically insulative may be used, and for example, it can be formed of epoxy resin. As a result, the connecting portion 25a and leading portion 25b of the cathode terminal 25 are mechanically coupled to each other through the protective resin 31 and electrically connected to each other through the fuse 27 only. In addition, the fuse 27 is protected by the protective resin 31.

The cathode terminal 25 structured as above is connected through the connecting portion 25a thereof and an electroconductive adhesive material 32 to the cathode layer 23 of the capacitor element 21. The capacitor element 21, anode lead 22, cathode layer 23 and fuse 27 all are encapsulated as an assembly with a rectangular parallelepiped-shaped external resin 30 as in the case of a conventional solid electrolytic capacitor already described above, the anode terminal 24 and cathode terminal 25 respectively have one ends encapsulated with the external resin 30 and the other ends bent in the shape of a letter "L" along the outer-most surface of the external resin 30 to be exposed to the outside thereof.

Next, a method of manufacturing the fused chip-type solid electrolytic capacitor of the first embodiment will be explained below.

FIG. 5 illustrates a state of the cathode terminal 25 to be used in this embodiment before being assembled. The cathode terminal 25 is provided in such a manner that a plurality of rectangular metal plates 34 are disposed in parallel and connected to a frame 33. A cathode terminal material, or the rectangular metal plate 34, as shown in FIG. 5, has a connecting portion 25a and a leading portion 25b which are separately formed by punching or the like and connected to each other by coupling portions 34b formed on the both sides thereof. An area between the connecting portion 25a and the leading portion 25b is punched to form an opening space 34a.

First, while maintaining it as shown in FIG. 5, each end of the fuse 27 is fixed by soldering or the like to the corresponding one of the connecting portion 25a and leading portion 25b of the rectangular metal plate 34, so that the fuse 27 is provided in a cross linking manner between the connecting portion 25a and leading portion 25b of the rectangular metal plate 34 for connection.

Next, the connecting portion 25a and leading portion 25b of the metal plate 34 are covered in a rectangular-plate shape with the electrically insulative protective resin 31 as shown in FIGS. 3 and 4. Where to be covered therewith are the entire surface of the fuse 27, the end 25c of the connecting portion 25a, and the end 25d of the leading portion 25b. As a result, the connecting portion 25a and leading portion 25b of the rectangular metal plate 34 are electrically connected and at the same time, mechanically coupled to each other in the integral form as shown in FIG. 3.

In this case, an epoxy resin was used for the protective resin 31, however, other resins can be used therefor if they are electrically insulative and satisfactory in mechanical strength. Also, any material other than resins can be used therefor if they are characterized as shown above.

Next, the rectangular metal plate 34 is cut along lines A—A, B—B, C—C and D—D as shown in FIG. 5. Because the connecting portion 25a and leading portion 25b of the rectangular metal plate 34 are connected to each other, the connecting portion 25a is never separated by such a cutting, which means that the connecting portion 25a and leading portion 25b are kept to be connected to the frame 33.

Subsequently, the electroconductive adhesive material 32 is applied to one surface of the connecting portion 25a of the rectangular metal plate 34 and thermally set while contacting with the capacitor element 21 prepared by the same method as in the prior art, thereby adhesively coupling the connecting portion 25a to the capacitor element 21. Accordingly, the connecting portion 25a and the capacitor element 21 are electrically connected to each other. In addition, the anode lead 22 and the anode terminal 24 are connected by welding.

Next, such an assembly body obtained as above is insulation-armored by electrically insulating resin using a transfer molding method. In this case, the insulation-armoring is carried out so that, as shown in FIGS. 3 and 4, a large part of the top section of the anode terminal 24 from its connecting point with the anode lead 22 and a large part of the top section of the leading portion 25b of the cathode terminal 25 are exposed externally.

Then, the rectangular metal plate 34 is cut along line E—E shown in FIG. 5 to separate from the frame 33. The externally exposed section of each of the anode terminal 24 and the cathode terminal 25 is bent along the outer-most surface of the external resin 30. So processed as shown above that the fused chip-type solid electrolytic capacitor of this embodiment is obtained.

SECOND EMBODIMENT

Figure 6:
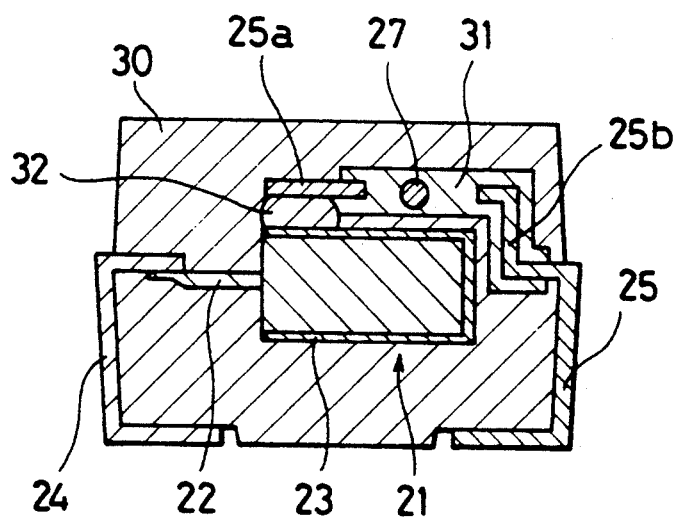
FIG. 6 is a cross-sectional view of a fused chip-type solid electrolytic capacitor according to a second embodiment of this invention.

FIG. 6 is a cross-sectional view of a fused chip-type solid electrolytic capacitor according to a second embodiment of this invention. The capacitor of the second embodiment is different from that of the first embodiment in that in the second embodiment, a leading portion 25b of a cathode terminal 25 has not only the connecting position with a fuse 27 and its neighboring area but also the surface area confronting to the bottom surface of a capacitor element 21 covered with a protective resin 31. As a result, a cathode layer 23 of the capacitor element 21 and the leading portion 25b of the cathode terminal 25 can be completely insulated by the protective resin 31. This means that such an unsatisfactory state that the fuse 27 does not serve to act due to defective insulation between the cathode layer 23 and the leading portion 25b of the cathode terminal 25 can be prevented from being taken place, thus being capable of obtaining highly reliable solid electrolytic capacitor.

CONFIRMATION TEST

Figure 2:
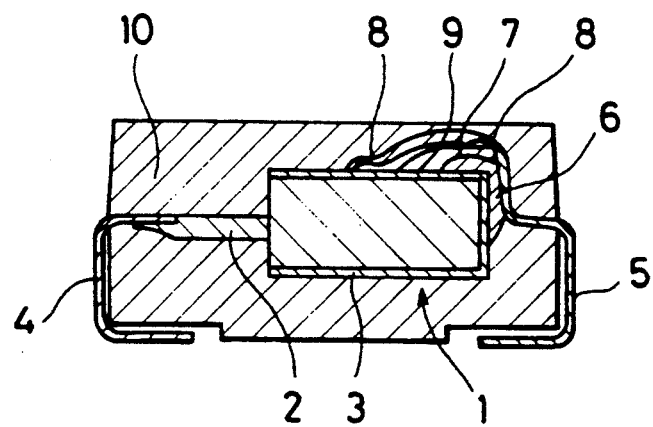
FIG. 2 is a cross-sectional view of the conventional fused chip-type solid electrolytic capacitor shown in FIG. 1.

In order to confirm the effects of this invention, a fused chip-type solid electrolytic capacitor according to the second embodiment and a conventional fused chip-type solid electrolytic capacitor as shown in FIGS. 1 and 2 respectively were prepared 1000 samples, and an excess current was applied to observe the melting-down state of a fuse. Through which, we obtained such a result that according to this invention, no samples has the solder flowed out from the cathode layer 23 or the capacitor element 21 burnt between the heating and melting-down of the fuse 27, which means that all of the samples of this invention are satisfactorily functionable as a safety equipment, and any secondary accident does not occur, and on the other hand, according to the prior art, out of 1000 capacitors, three samples have the solder flowed out from the cathode layer.

This result can be considered because in case of a capacitor of this invention, the cathode layer 23 of the capacitor element 21 is provided so as not to be near the fuse 27, and the cathode terminal 25 can be formed by machining thereby to improve the flatness and dimensional accuracy and uniformity thereof, so that the characteristic of the fuse 27 being connected thereto can be made stable, etc.

In addition, a fused chip-type solid electrolytic capacitor of this invention has the cathode terminal 25 outstandingly superior in surface flatness and dimensional accuracy and uniformity, so that the fuse 27 can be automatically connected thereto by a wire bonding machine, largely contributing to an extreme simplification of production process. In addition, the fact that the fuse 27 and its connecting portions are completely covered with the protective resin 31 in advance makes it possible to reduce such a possibility that the fuse 27 is applied with a mechanical stress in the assembling process to be damaged, which means that the reliability can be extremely improved.

As described above, according to this invention, flowing-out of a solder from a cathode layer or damage to a capacitor element by burning is difficult to be taken place even when short-circuit is happened. As a result, the stability can be improved on an entire circuit basis.

In addition, the connection length of a fuse can be made constant, so that the fuse connection process between the connecting portion and leading portion of a cathode terminal can be automatized. Accordingly, the process itself can be simplified and the yield can be enhanced, so that such effects can be provided that the production cost can be reduced and the reliability of fuse connection can be increased as well as melting characteristic of a fuse can be made stable.

What is claimed is:

1. A fused chip-type solid electrolytic capacitor comprising:
    a solid electrolytic capacitor element having an anode lead and a cathode layer;
    an anode terminal connected to the anode lead of said solid electrolytic capacitor element;
    a cathode terminal with a fuse connected to the cathode layer of said solid electrolytic capacitor element; and
    an electrically insulating material having at least one part of each of said anode terminal and cathode terminal exposed externally and covering said solid electrolytic capacitor element and the other part of each of said anode terminal and cathode terminal, wherein said cathode terminal comprises a connecting portion and a leading portion which are made of plate-like metals respectively and disposed separately from each other on substantially same plane, a fuse which is provided between said connecting portion and leading portion in a cross linking manner thereby connecting them electrically to each other and an electrically insulative coupling body mechanically coupling said connecting portion and leading portion, and said cathode terminal being electrically connected through said connecting portion to the cathode layer of said solid electrolytic capacitor element, said electrically insulative coupling body covering the entire periphery of said fuse and a position where each end of said fuse is connected to the corresponding one of the connecting portion and leading portion of said cathode terminal, said coupling body further being formed so as to provide space between said connecting portion and leading portion and covering said connected positions on said connecting portion and leading portion not only on the cathode layer side but also the counter side thereof.

2. A fused chip-type solid electrolytic capacitor as claimed in claim 1, wherein said coupling body further covers a surface of said leading portion confronting said cathode layer.

3. A fused chip-type solid electrolytic capacitor as claimed in claim 2, wherein said cathode layer covers said entire side surface of said capacitor element.

4. A fused chip-type solid electrolytic capacitor as claimed in claim 2, wherein end portions of said anode terminal and cathode terminal project from said electrically insulating material and are disposed so as to confront a side surface of said electrically insulating material.

5. A fused chip-type solid electrolytic capacitor as claimed in claim 1, wherein said cathode layer covers said entire side surface of said capacitor element.

6. A fused chip-type solid electrolytic capacitor as claimed in claim 1, wherein said coupling body is disposed apart from said cathode layer.

7. A fused chip-type solid electrolytic capacitor as claimed in claim 1, wherein end portions of said anode terminal and cathode terminal project from said electrically insulating material and are disposed so as to confront with a side surface of said electrically insulating material.

8. A method of manufacturing a fused chip-type solid electrolytic capacitor comprising the steps of:
   forming a cathode terminal material having a connecting portion and a leading portion which are made respectively of plate-like metals and disposed separately to each other on substantially same plane, and a coupling portion which is made of a plate-like metal to couple said connecting portion and leading portion thereof;
   providing a fuse between the connecting portion and leading portion of said cathode terminal material in a cross linking manner and fixing one end of the fuse to said connecting portion and fixing the other end thereof to said leading portion;
   covering the entire periphery of said fuse and a position where each of end of said fuse is connected to the corresponding one of said connecting portion and leading portion by an electrically insulative coupling body thereby mechanically coupling said connecting portion and leading portion by an electrically insulative coupling body, said coupling body being formed so as to provide a space between said connecting portion and leading portion and covering said connected positions of said connecting portion and leading portion not only on the cathode layer side but also the counter side thereof;
   cutting said coupling portion of said cathode terminal material for forming a cathode terminal;
   electrically connecting said connecting portion of said cathode terminal to a cathode layer of a solid electrolytic capacitor element;
   connecting an anode terminal to an anode lead led from said solid electrolytic capacitor element;
   covering said solid electrolytic capacitor element, said anode terminal and said cathode terminal with an electrically insulating material in such manner that one part of each of said anode terminal and cathode terminal is exposed externally; and
   bending the exposed parts of said anode and cathode terminals.

9. A method of manufacturing a fused chip-type solid electrolytic capacitor as claimed in claim 8, wherein said coupling body further covers a surface of said leading portion confronting said cathode layer.

10. A method of manufacturing a fused chip-type solid electrolytic capacitor as claimed in claim 8, wherein said cathode layer covers said entire side surface of said capacitor element.

11. A method of manufacturing a fused chip-type solid electrolytic capacitor as claimed in claim 8 wherein said cathode layers covers said entire side surface of said capacitor element.

12. A method of manufacturing a fused chip-type solid electrolytic capacitor as claimed in claim 8 wherein said coupling body is disposed apart from said cathode layer.

13. A method of manufacturing a fused chip-type solid electrolytic capacitor as claimed in claim 8 wherein said coupling body is disposed apart from said cathode layer.

14. A method of manufacturing a fused chip-type solid electrolytic capacitor as claimed in claim 8, wherein end portions of said anode terminal and cathode terminal project from said electrically insulating material and are disposed so as to confront with a side surface of said electrically insulating material.

15. A cathode terminal to be used in a fused chip-type solid electrolytic capacitor comprising:
   a connecting portion and a leading portion which are made respectively of plate-like metals and disposed separately to each other on substantially same plane;
   a fuse provided between said connecting portion and leading portion thereof in a cross linking manner and having the either ends thereof correspondingly connected thereto; and
   an electrically insulative coupling body covering the entire periphery of said fuse and mechanically coupling said connecting portion and leading portion.

16. A cathode terminal to be used in a fused chip-type solid electrolytic capacitor as claimed in claim 15, wherein said electrically insulative coupling body covers the entire periphery of said fuse and a position where each end of said fuse is connected to the corresponding one of the connecting portion and leading portion of said cathode terminal.

17. A cathode terminal to be used in a fused chip-type solid electrolytic capacitor as claimed in claim 15 wherein said electrically insulative coupling body covers the entire periphery of said fuse, a position where each end of said fuse is connected to the corresponding one of the connecting portion and leading portion of said cathode terminal, and a surface of the leading portion of said cathode terminal confronting to said capacitor element.

18. A method of manufacturing a cathode terminal to be used in a fused chip-type solid electrolytic capacitor comprising the steps of:
   forming a cathode terminal material having a connecting portion and a leading portion which are made respectively of plate-like metals and disposed separately to each other on substantially same plane, and a coupling portion which is made of a plate-like metal to couple said connecting portion and leading portion;

providing a fuse between the connecting portion and leading portion of said cathode terminal material in a cross linking manner and fixing one end of the fuse to said connecting portion and the other end thereof to said leading portion;

covering the entire periphery of said fuse and a position where each end of said fuse is connected to the corresponding one of said connecting portion and leading portion and mechanically coupling said connecting portion leading portion by an electrically insulatives coupling body, said coupling body being formed so as to provide a space between said connecting portion and leading portion and covering said connected positions of said connecting portion and leading portion not only on the cathode layer side but also the counter side thereof; and cutting said coupling portion.

19. A method of manufacturing a cathode terminal to be used in a fused chip-type solid electrolytic capacitor as claimed in claim 18, wherein said electrically insulative coupling body covers the entire periphery of said fuse, and a position where each end of said fuse is connected to the corresponding one of the connecting portion and leading portion of said cathode terminal.

20. A method of manufacturing a cathode terminal to be used in a fused chip-type solid electrolytic capacitor as claimed in claim 18, wherein said electrically insulative coupling body covers the entire periphery of said fuse, a position where each end of said fuse is connected to the corresponding one of the connecting portion and leading portion of said cathode terminal, and a surface of the leading portion of said cathode terminal confronting to said solid capacitor element.

* * * * *